May 25, 1926.

F. G. EIKER

VEHICLE TIRE

Filed Oct. 31, 1922

1,585,837

Inventor
Frisbey G. Eiker
by J. G. Newton
Attorney

Patented May 25, 1926.

1,585,837

UNITED STATES PATENT OFFICE.

FRISBEY G. EIKER, OF WASHINGTON, DISTRICT OF COLUMBIA.

VEHICLE TIRE.

Application filed October 31, 1922. Serial No. 598,188.

This invention relates to a vehicle tire of that class known in the trade as a solid or cushion tire, that is, a tire in which most of the resiliency of the tire is due to the resiliency of the thick rubber of which all or most of the tire is composed. The invention also relates to the process of making the same, and has for its object the construction of a tire that will stand the hardest usage and retain its resiliency, while, at the same time, being practically impervious to punctures sufficiently deep to destroy the resiliency of the tire, thus greatly prolonging the life of the cushion tire.

Another object of the invention is to provide a tire kept resilient by air but in a construction that will prevent the escape of the air after the tire construction is finished.

Another object of the invention is to provide a resilient rubber cushion tire having an air tube encased therein without any exposed valves to get out of order.

With these and other objects in view, which will be apparent to those skilled in the tire art as the description proceeds, I will describe the same in connection with the appended drawings in which.

1 represents the tire tread and 2 a tube preferably made of rubber, the ends of the tube brought in proximity to each other at 3, where I may employ a valve construction comprising a short rubber tube 6 small enough to fit into the meeting ends of the tube 2 and vulcanized therein and having therein a conventional valve (not shown) for the attachment of a pump to inflate the tube.

Figure 1:
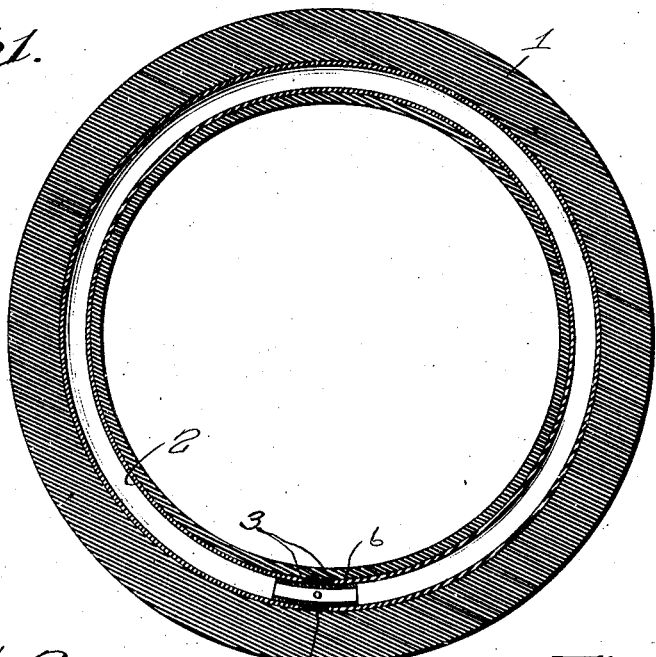
Figure 1 is a sectional view of the tire on the line 1—1 of Fig. 4.
Figure 4:
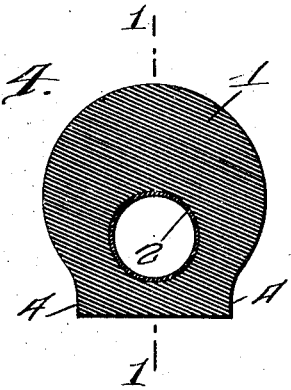

After the tube is inflated and the valve is automatically closed in the usual way by pressure of the air thereon and I desire to construct the tire shown in Figs. 1 and 4, I may mold around the smaller tube 6 a rubber casing 6' covering the tube 6 and the valve. I then place the tube in a mold and support the same in any convenient way and mold the solid rubber tread 1 and portions 4 around the tube and casing 6' so as to form a solid rubber tire completely encasing the smaller tube 6, casing 6' and rubber tube 2, the rubber being molded in a solid airtight mass around the inflated tube is then suitably vulcanized on the tread and other portions as desired and the tube may be vulcanized to the surrounding casing. This construction will prevent any possible escape of the air in the enclosed rubber tube even though the air for any reason leaks through the tube. The rubber also as shown in Fig. 1 encases the valve 3 so that if the valve should, for any reason, begin to leak, the air escaping through the same could not escape through the surrounding incasing rubber.

Figure 2:
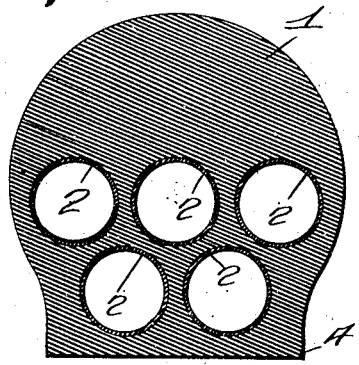
Fig. 2 is a sectional view of a modification at right angles to the view shown in Fig. 1.

In Fig. 2 I have shown a modification in which I may insert several tubes 2 and 7 mold the rubber around them in the manner described relative to Figs. 1 and 4.

Figure 3:
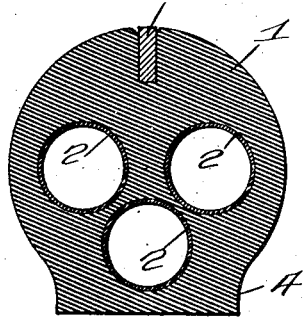
Fig. 3 is a sectional view of another modification similar to the view of Fig. 2, and, Fig. 4 is a sectional view of a tire shown in Fig. 1, the section being at right angles to the sectional view of Fig. 1.

In Fig. 3, I have shown three tubes encased in an airtight solid rubber casing and a non-skid device 5 embedded in the rubber tread.

My tube 2 may be made of rubber or I may have an inner rubber tube covered with a rubberized fabric tube. If I use a rubber tube I may first inflate the tube as full of air as will conveniently hold and then partially mold a rubber casing around it or enclose it with rubberized fabric to make it sufficiently strong to hold a greater pressure of air. Having surrounded the rubber tube with this partially completed outer casing, I then inflate the rubber tube sufficiently full of air to get any pressure desired. I may then withdraw the pump connection used in inflating the inner tube and mold around the valve the casing 6' completely covering the valve inlet or outlet, and then complete the molding of the tread 1 and the portions 4 and vulcanize the completed tube as desired. Of course the amount of pressure of the air in the inner tube can be regulated to adapt the completed tire for different pressures depending upon the weight of the vehicle on which the tire is to be used.

Having described my invention what I claim is:

1. A rubber tire comprising a rubber tube, united at its end by a smaller tube having a valve therein, the entire tube and valve being encased in rubber, said rubber being solid at its tread portion, and sufficiently thick of itself to form a resilient tread, a portion of the surrounding rubber being also shaped to be clamped by the ordinary tire rim.

2. The process of making a rubber tire, which consists in inflating a tube through an opening therein, and molding airtight around it a thick tread portion and a portion adapted to be clamped by a rim all in one solid piece entirely surrounding the inner tube and said opening.

3. The process of making a tire which comprises inflating a tube through a valve, then molding around it a rubber casing to form the tread and a portion adapted to be clamped by a rim, said tread and portion entirely encasing the tube and valve and vulcanizing the tube to the casing.

In testimony whereof, I hereunto affix my signature.

FRISBEY G. EIKER.